United States Patent [19]

Dilworth

[11] 4,116,537

[45] Sep. 26, 1978

[54] THERMAL COMPENSATION APPARATUS

[75] Inventor: Donald C. Dilworth, Medford, Mass.

[73] Assignee: Honeywell Inc., Minneapolis, Minn.

[21] Appl. No.: 620,512

[22] Filed: Oct. 8, 1975

[51] Int. Cl.² ............................................. G02B 7/02
[52] U.S. Cl. ................................................ 350/253
[58] Field of Search ...................... 350/253, 255, 310; 354/286

[56] References Cited

U.S. PATENT DOCUMENTS 3,447,875  6/1969  Goldberg ............................ 350/253

OTHER PUBLICATIONS

Brady, M. M. "Simple Temperature Compensation of Large Rectangular Waveguide Resonant Cavities," Electronic Engineering 2-1969, pp. 198-199.

Primary Examiner—John K. Corbin
Assistant Examiner—Wm. H. Punter
Attorney, Agent, or Firm—Charles J. Ungemach

[57] ABSTRACT

Apparatus to adjust the axial position of an optical element to compensate for the effects of temperature changes and operable to produce motion of greater magnitude than possible with conventional expansion members. A pair of expansion members is provided. Each of the expansion members has one end which is fixed to a frame or reference means and the other ends of each are joined together and connected to a linkage member which is affixed to the optical element. The angle between the expansion members and the direction of motion of the optical element is set at a value which will produce the desired motion of the optical element.

5 Claims, 3 Drawing Figures

THERMAL COMPENSATION APPARATUS

BACKGROUND OF THE INVENTION

In optical devices the length of the optical paths may vary because of temperature changes in the environment. For example, the focal length of a lens system may change because the temperature change in the surrounding environment causes a change in the refractive index of the lens or other optical element. This phenomenon is particularly severe with the use of plastic or germanium lenses, and accordingly, means for compensating for changes in the focal length of an optical system due to changes in temperature has been found desirable.

A variety of devices to accomplish this purpose have been known in the prior art. Many of these have been quite complex and bulky, while others have been known to be inaccurate or unstable. Apparatus such as is found in the Leon J. Berman U.S. Pat. No. 3,612,664, which utilizes a liquid filled chamber and a piston to produce motion upon a change in ambient temperature is quite bulky and has a disadvantage of possible loss of fluid. A thermal positioning device such as shown in the W. A. Porter et al U.S. Pat. No. 2,964,903 employs a pair of parallelly mounted expansible elements, each of which has an electric coil wound thereabout to produce heat and thus linear motion of the expansible elements is found to be quite bulky, complex and unable to produce compensating motion due to ambient temperature changes of sufficient magnitude for some optical requirements. It also consumes electrical energy and requires additional means to measure temperature and adjust the voltage. An Alfred Kilgus U.S. Pat. No. 3,671,108 utilizes a compensating ring made of a material having a high coefficient of expansion and being shaped with V-shaped projections so that thermal expansion of the ring will cause linear motion of the lens which bears against the ring has been found to be unable to produce the magnitude of motion needed to compensate for large changes in focal length.

SUMMARY OF THE INVENTION

The present invention overcomes the difficulties found in the prior art by providing an optical thermal compensator which is simple in construction and relatively light in weight and yet able to produce compensating motions of magnitude greater than the most expansible of expansion members can produce. Briefly this is accomplished by an arrangement in which at least one expansion member is mounted at an angle other than 90° to the direction of motion desired for the optical element. One portion of the expansion member is fixed to a reference means or frame of the device while the other end is connected to a third member which is mounted on the optical means to be moved. Means are provided to constrain the motion of the optical means to the desired direction and the opposite direction. The angle made by the expansion members is set at a value which is determined to be necessary for compensation of that particular optical element.

BRIEF DESCRIPTION OF THE DRAWINGS

The nature of the invention and the distinguishing features and advantages thereof will be more clearly understood from the following detailed description and accompanying drawings in which.

DESCRIPTION OF THE PREFERRED EMBODIMENTS

Figure 1:
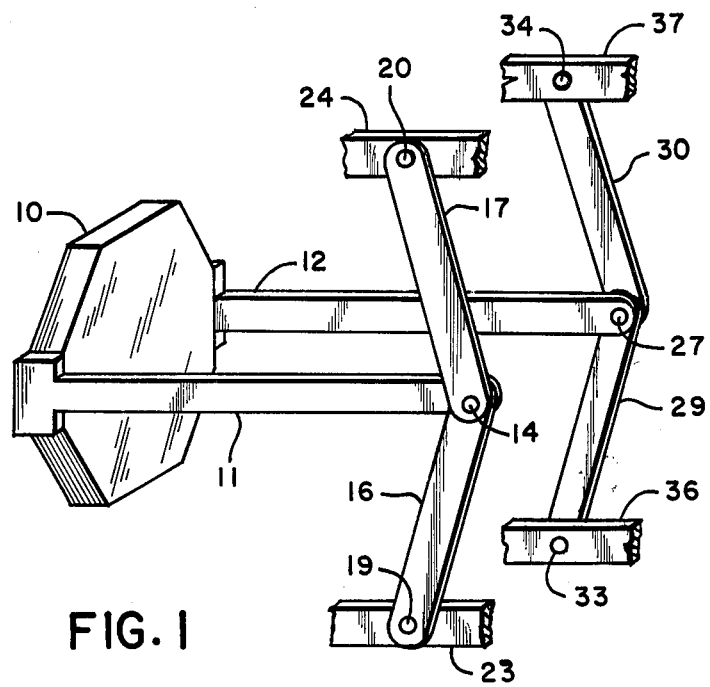
FIG. 1 is a view of one embodiment of the present invention wherein a single optical element is caused to experience linear motion with changes in temperature.

In FIG. 1, a lens or mirror or other optical means 10 is shown mounted between two horizontally extending linkage members 11 and 12. Members 11 and 12 are connected to the optical element 10 by conventional means and are preferably constructed of a material chosen to have a relatively low coefficient of thermal expansion so as to affect the linear motion of the optical element only slightly. The choice of material for members 11 and 12 is not critical however, since, as will be seen, the apparatus can be adjusted and tuned so as to account for motion which may be introduced by the linkage members.

Linkage member 11 extends to the right in FIG. 1 and at its end is pivotally or flexibly connected by suitable fastening means 14 to a first portion or end of a pair of expansion members 16 and 17. Fastening means 14 should allow relative movement between member 11 and expansion members 16 and 17. Expansion members 16 and 17 extend outwardly from linkage member 11 at an angle thereto and have a second portion or end connected by suitable fastening means 19 and 20 to fixed reference means or frame members 23 and 24 respectively. Fastening means 19 and 20 should also allow relative motion to occur between the members it connects. Linkage member 12 extends to the right in FIG. 1 and has its end pivotally or flexibly connected by suitable fastening means 27 to the ends of a pair of expansion members 29 and 30. Expansion members 29 and 30 extend outwardly from linkage member 12 at an angle thereto and have their other ends connected by suitable fastening means 33 and 34 to fixed frame members 36 and 37 respectively.

Expansion members 16, 17, 29 and 30 are preferably constructed from a material chosen to have a relatively high coefficient of thermal expansion although as with linkage members 11 and 12, the expansion coefficient is not critical since the geometry of the system, as will be explained, may be varied so as to produce the desired motion of optical element 10. It should also be understood that while two pairs of expasion members have been shown in FIG. 1, expansion members 16 and 29 need not necessarily be expansion members but could be guide members constraining the motion of the optical element 10 and could be replaced entirely by other guide means constraining the motion of the optical element 10 to a single direction and its opposite. As a matter of fact, only one expansion member is actually necessary as long as the optical element is not free to move in any but the desired direction.

In designing an optical system, the various parameters such as the focal length of the optical elements and the temperature changes to which they are to be subjected will be known. The change in focal length per degree change in temperature can therefore be calculated or observed through experimentation and thus the amount of motion necessary to compensate for the change in focal length may be established in advance. The structure shown in FIG. 1 can be modified by changing the lengths of the expansion members 16, 17, 29 and 30 and by changing the angles between the expansion members and the linkage members 11 and 12 so as to produce various changes in the amount of motion which will occur for each degree of temperature change. In FIG. 1 it is seen that the expansion members 16, 17, 29 and 30 each have one end that is fixed to the frame and thus is not movable. Since these members are made of a material having a relatively high coefficient of thermal expansion, as temperature changes occur the expansion members will change length but only the ends which are connected to the linkage members 11 and 12 are free to move. Because of the connection shown in FIG. 1, the expansions and contractions of members 16, 17, 29 and 30 will be accompanied by motion of linkage members 11 and 12 to the right and left in FIG. 1 and the amount of such motion for each degree of change in temperature will be a function of the length of the expansion members, the coefficient of thermal expansion of the material of which they are made and the angle between a line drawn between the first and second portions or ends of the expansion members and the direction of motion of the optical element 10.

Figure 2:
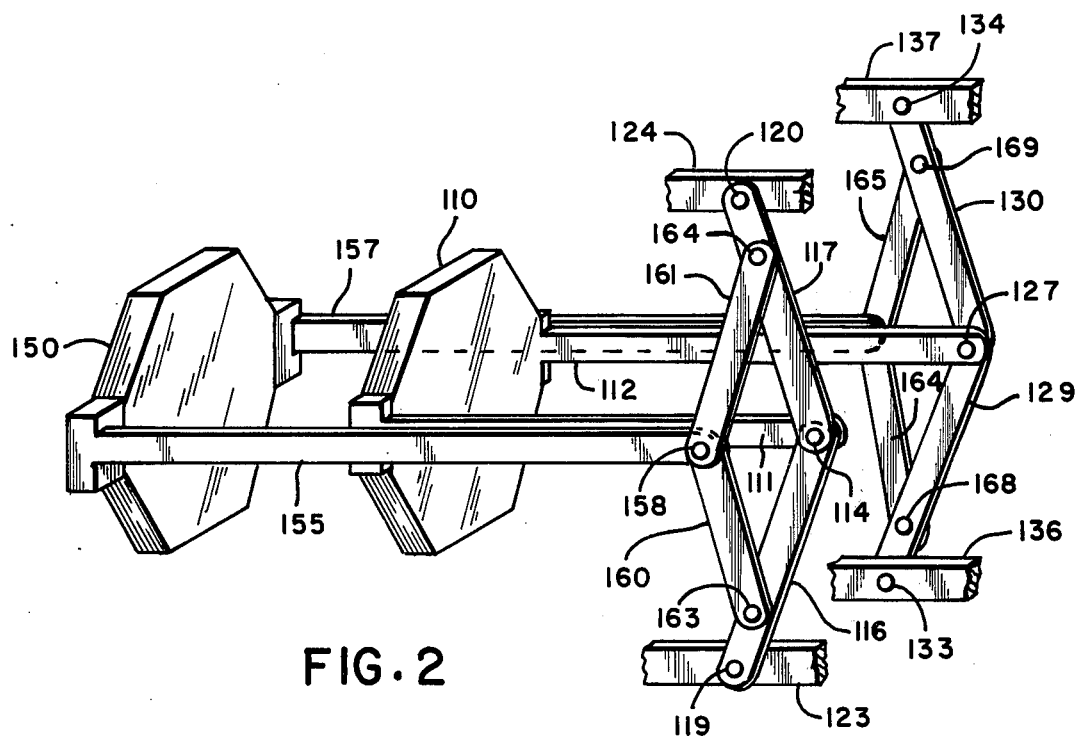
FIG. 2 is a view of a second embodiment of the present invention in which two optical elements are each caused to experience different linear motions with the same expansion members.
Figure 3:
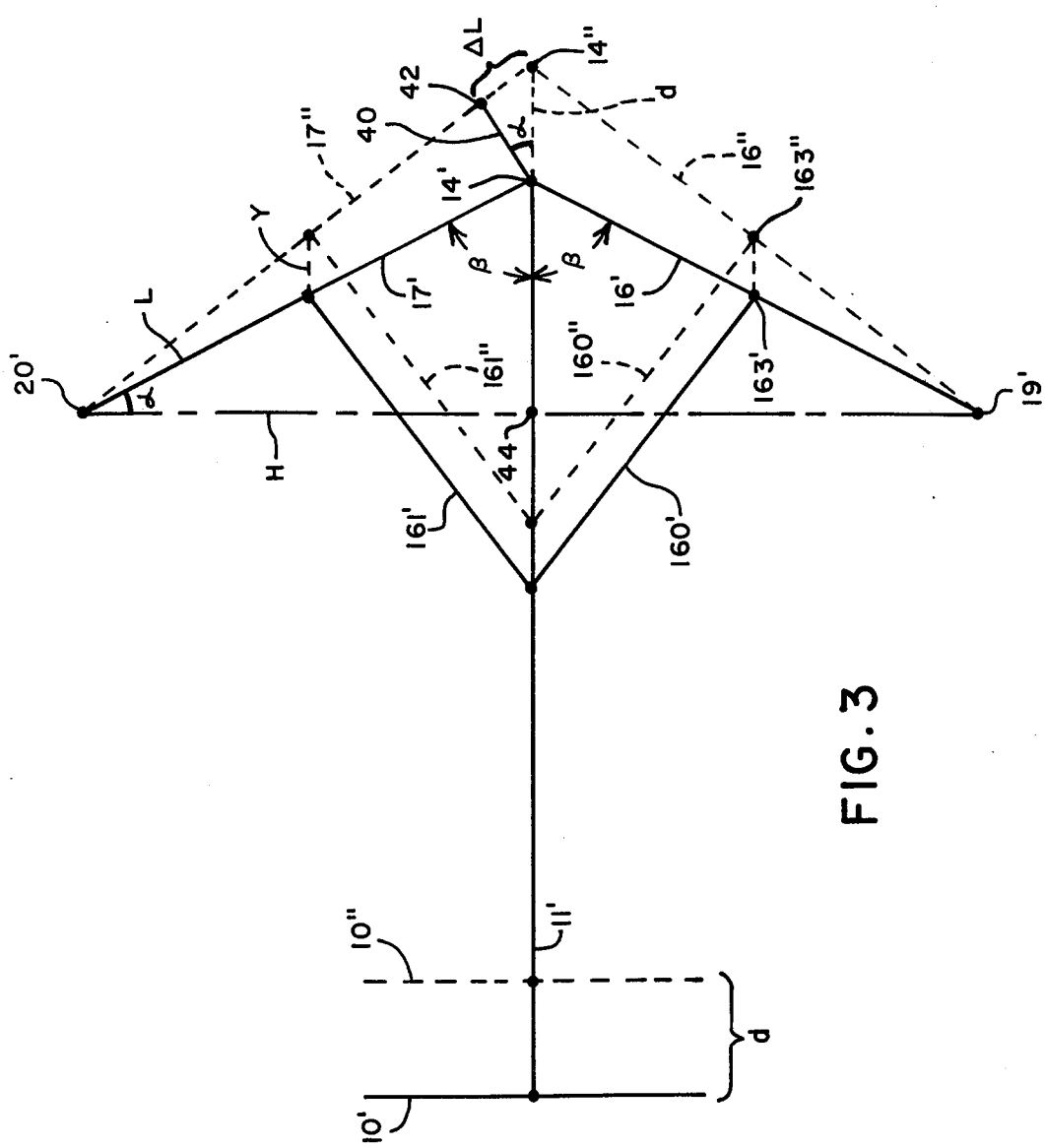
FIG. 3 is a geometrical diagram used in explaining the motion effects of the elements of FIGS. 1 and 2.

A better understanding of the manner in which the apparatus of FIG. 1 can be adjusted to cause linear motion of the optical element 10 will be obtained with reference to FIG. 3. In FIG. 3 various elements which are shown in FIG. 1 and FIG. 2 are shown only as lines for purposes of clarity. The lines will be given reference numerals corresponding to the elements in FIGS. 1 and 2 to which they refer, when applicable, except that the reference numerals will be primed. Also in FIG. 3 the solid lines are indicative of the arrangement of the optical system at a first temperature while the dashed lines are representative of the system when it has undergone expansion and linear motion due to temperature change. Reference numerals used with respect to the solid black lines at the first temperature will have a single prime while reference numerals relating to the second position of the system at a second temperature will have a double prime.

In FIG. 3 an optical element 10' is shown connected to a linkage member 11'. Linkage member 11' extends to the right and is connected at fastener 14' to the ends of a pair of expansion members 16' and 17'. Expansion members 16' and 17' extend outwardly and at an angle $\beta$ with respect to linkage member 11' and have their other ends connected by fastening means 19' and 20' to the fixed frame members 23 and 24 not shown. In FIG. 3 the length of expansion member 17' from the fastening means 14' to the fastening means 20' has been designated as L and the vertical distance between the fastening means 20' and the horizontal linkage member 11' has been designated as H. Also, the angle between the expansion member 17 and the dot-dashed line representing the height H has been designated as $\alpha$. Two other members connected from about midway of expansion members 16' and 17' and extending back where they are connected proximate linkage member 11' are shown for purposes of explanation of the operation of FIG. 2 and will not be used in connection with the explanation of the operation of FIG. 1. For the present their existence in FIG. 3 should be ignored.

For purposes of explanation of FIG. 3 it will be assumed that the expansion member 11' is made of a material having a zero coefficient of thermal expansion and so that no expansion of number 11' occurs with changes in temperature. If it is assumed that the temperature to which the system is subjected increases, expansion of expansion members 16' and 17' will occur. Since the outer ends of expansion members 16' and 17' are connected to fixed members by fastening means 19' and 20', all motion which occurs because of the expansion of expansion members 16' and 17' will manifest itself in movement of the fastening means 14' to the right in FIG. 3. Pursuant to a predetermined temperature change the members of FIG. 3 will assume a position shown by the dashed lines.

It will be seen in FIG. 3 that the fastening means 14' is moved a distance $d$ to a new position represented by reference numeral 14'' and that the optical element 10' has likewise moved the same distance $d$ to assume a new position shown by dashed lines 10''. A construction line 40 has been drawn in FIG. 3 starting at the fastening means 14' and extending substantially perpendicularly to expansion member 17'' at a point identified by reference numeral 42. The distance between the fastening means 20' and point 42 has been chosen to be equal to the length L of the original expansion member 17' and thus the distance between point 42 and the fastening means 14'' is indicative of the change of length of the expansion member 17' and is identified in FIG. 3 with the reference $\Delta L$. In the following mathematical analysis, and based upon the angle $\alpha$ being relatively small, it will be assumed that the triangle having vertices 14', 14'' and 42 is similar to the triangle having vertices 14', 20' and 44 where 44 represents the point at which the vertical distance H intersects the linkage member 11'. Thus, the angle between the construction line 42 and the horizontal distance $d$ will be $\alpha$. As can be seen from the triangle formed at vertices 14', 20' and 44, $$\cos \alpha = (H/L) \tag{1}$$

rewriting equation (1), $$L = H/\cos\alpha \tag{2}$$

Also, $$\Delta L = EL \tag{3}$$

where E is the coefficient of thermal expansion of expansion member 17'.

From the smaller triangle having vertices 14', 14'' and 42, $$\sin \alpha = \Delta L/d \tag{4}$$

Substituting equation (3) into equation (4) and rearranging equation (4), $$d = EL/\sin \alpha \tag{5}$$

Substituting equation (2) into equation (5), $$d = EH/\sin \alpha \cos \alpha \tag{6}$$

or, $$d = EH/\tfrac{1}{2} \sin 2\alpha \tag{7}$$

And rearranging equation (7), $$\sin 2\alpha = 2EH/d \tag{8}$$

From equations (7) and (8), it is seen that the distance $d$ which the optical element 10' moves to its position 10" is dependent upon the height H of the fastening means 20' above the linkage member 11' (which is a function of L), the coefficient of thermal expansion E of the expansion member 17 and the magnitude of angle $\alpha$ (which is a function of angle $\beta$).

If it be assumed, for example, that the height H were set at 3.25 inches and the coefficient of thermal expansion E set at $71 \times 10^{-6}$ (the expansion coefficient of nylon) and that $d$ was desired to be 0.000755 inches for each degree Fahrenheit of temperature change then from equation (8), $$\sin 2\alpha = (2 \times 71 \times 10^{-6} \times 3.25/0.000755) = 0.61126$$

and therefore, $\alpha$ will equal 18.8°. It is seen that desired motion of optical element 10 may be chosen merely by altering any of the above variables. For example, H could be made larger or smaller and materials having different coefficients of thermal expansion used to obtain different motions. It is also seen that while in connection with FIG. 3 it was assumed that the linkage member 11' was made of a material having a zero coefficient of thermal expansion, should there be motion as a result of expansion of number 11'. This motion would merely have to be added to or subtracted from the desired motion $d$ before utilizing $d$ in connection with equation (8).

It should also be observed that with an $\alpha$ of 18.8° and an H equal to 3.25 inches, $\cos \alpha$ is 0.94665 and from equation (2), L equals 3.43 inches. Then from equation (3), $\alpha L$ equals $71 \times 10^{-6} \times 3.43$ or $2.44 \times 10^{-4}$ inches which is a little less than one third of the $7.55 \times 10^{-4}$ inches that the optical element 10 moved in the above example. It is thus seen that the apparatus of FIG. 1, provides a motion multiplication to compensate for large changes in focal length due to temperature.

The apparatus of FIG. 2 shows how the present invention may be utilized to provide temperature compensation for two different optical elements by moving each of the optical elements a different amount but still utilizing the same two pair of expansion members.

In FIG. 2, a first optical thermal compensation system is shown in the same form as that described in connection with FIG. 1 comprising an optical element 110 connected to a pair of linkage members 111 and 112 which in turn are pivotally or flexibly connected by fastening means 114 and 127 to two pairs of expansion members 116, 117, 129 and 130, which in turn are fastened by suitable fastening means 119, 120, 133, and 134 to fixed frame members 123, 124, 136 and 137. The elements so far described in connection with FIG. 2 operate in the same manner as that described in connection with FIG. 1.

Also shown in FIG. 2 is a second optical element 150, which like optical element 110 may be a lens or mirror or other optical device which requires thermal compensation but, perhaps, of a different magnitude than that required by optical element 110. Optical element 150 is shown fastened to a pair of linkage members 155 and 157 which extend to the right in FIG. 2, parallel to but not connected with linkage members 111 and 112. Linkage member 155 is pivotally or flexibly connected at its other end by suitable means such as fastening means 158 to a first portion or end of a pair of linkage members 160 and 161. A second portion or end of each linkage member 160 and 161 is connected by suitable means such as fastening means 163 and 164 to the expansion members 116 and 117 respectively at a point part way between the first and second portions or ends thereof. Linkage member 157 is pivotally connected at its other end by suitable means such as fastening means, not shown, to a first portion or end of a pair of linkage members 164 and 165 having second portions or ends which are connected by suitable means such as fastening means 168 and 169 to the expansion members 129 and 130 respectively at a point that is part way between the first and second portions or ends thereof.

As will be seen in connection with a further description in FIG. 3, as temperature changes produce motion of optical means 110 and 150, expansion members 116, 117, 129, and 130 will change length thus causing a predetermined linear motion of optical elements 110 and 150 respectively. Optical element 110 will move by an amount calculated in accordance with the above explanation used in connection with FIG. 3 while optical element 150 will move in the same direction as optical element 110, but by a lesser amount.

Referring again to FIG. 3, the solid lines 160' and 161' represent the positions of the linkage members 160 and 161 of FIG. 2 at an initial temperature while the dashed line position indicated by reference numerals 160" and 161" represent the position of linkage members 160 and 161 at an elevated temperature. As explained in connection with the operation of FIG. 1, when the temperature changes from the initial value to the elevated value, expansion members 16' and 17' increase in length and the fastening means 14' as well as the optical element 10' move to the right by an amount $d$. It can be seen in FIG. 3 that the fastening means 163' and 164' also move to the right but by an amount indicated in FIG. 3 as reference numeral $y$. It is obvious from FIG. 3, that the amount of motion of fastening means 164 is less than the amount of motion of fastening means 14' and the distance $y$ is less than the distance $d$. Although of lesser magnitude, the motion of the fastening means 164' is proportional to the motion of the fastening means 14' and thus the movement $y$ of optical element 150 (not shown in FIG. 3 for simplicity) which is connected to the linkage means 160' and 161' may be calculated as in the example above as some fraction of $d$ depending on the positions chosen for the fastening means 163' and 164'. Thus, as in connection with FIG. 1, a desired motion can be established which operates in accordance with equation (8) above but the magnitude of which can be varied by changing the fastening position of members 160 and 161 to the expansion members 116 and 117 respectively.

It can thus be seen that I have provided apparatus for moving an optical element to correct for changes in an optical system that occur due to temperature variations. It is seen that my system is straightforward and simple and can be adjusted to a number of varying required motions as well as operating to produce greater movement of the optical element than could be accomplished heretofore. It is also seen that I have provided a system which can cause motion of two or more optical elements from the same pairs of expansion members so as to compensate different elements of a system in different ways.

Many improvements will appear to those skilled in the art. For example, to provide for subtle refinements the expansion members 16 and 17 could be made from materials having different coefficients of thermal expansion. Since not all of the thermal expansion and thermal index coefficients are known with precision, it would then be possible to adjust the correction after testing, by inserting rods with such different materials. It is also apparent that instead of using the balanced arrangement employing two pairs of expansion members as in FIG. 1, it would be possible to construct an arrangement which would hold the optical element 10 and be positioned by a single pair of expansion members connected like that shown in FIG. 1, or even a single expansion member provided that means for guiding the optical element in the desired direction is also supplied. Also, while I have shown the angle $\beta$ as acute in the preferred embodiments, it is clear that $\beta$ may also be obtuse. If motion to the left for a temperature increase were desired, it is only necessary that the angle $\beta$ be other than 90°. Accordingly, I do not wish to be limited by the specific embodiments described above, but rather only to be limited by the scope of the claims appended hereto.

I claim:

1. Apparatus for moving optical means along a first direction and an opposite direction with respect to reference means in accordance with temperature variations to compensate for optical changes which may accompany the temperature variations comprising:

first means connected to the optical means so that movement of said first means is accompanied by movement of the optical means;

second means having a first portion connected to the reference means at a first location and having a second portion connected to said first means at a second location such that a line through the first location and the second location lies at an angle of other than 90° with respect to the first direction and the opposite direction, said second means being at least partly constructed of a material having a coefficient of thermal expansion such that the distance between the first location and the second location changes with the temperature variations to produce a first motive force on said first means; and third means constraining the optical means to move in the first and opposite direction, said third means including a first portion connected to the reference means at a third location and a second portion connected to the first means and wherein said third means is at least partly constructed of a material having a coefficient of thermal expansion such that the distance between the third location and the second location changes with the temperature variations to produce a second motive force on said first means and wherein the second portion of said third means is connected to the first means at the second location and alined through the third location and the second location lies at an angle of less than 90° with respect to the first direction.

2. Apparatus according to claim 1 wherein the first means comprises a first linkage member extending generally along the first direction and the second and third means comprise first and second expansion members with the first and third locations lying substantially equally distant from and on opposite sides of the first linkage member.

3. Apparatus according to claim 2 including a second linkage member connected to the optical means and extending generally along the first direction substantially parallel to the first linkage member;

a third expansion member having a first portion connected to said second linkage member at a fourth location and a second portion connected at a fifth location to the reference means so that a line through the fourth location and the fifth location lies at an angle less than 90° with respect to the first direction; and a fouth expansion member having a first portion connected to said second linkage member at the fourth location and a second portion connected at a sixth location to the reference means so that a line through the fourth location and the sixth location lies at an angle less than 90° with respect to the first direction, the fourth and fifth locations lying substantially equally distant from and on opposite sides of the second linkage member.

4. Apparatus for moving optical means along a first direction and an opposite direction with respect to reference means in accordance with temperature variations to compensate for optical changes which may accompany the temperature variations comprising:

first means connected to the optical means so that movement of said first means is accompanied by movement of the optical means;

second means having a first portion connected to the reference means at a first location and having a second portion connected to said first means at a second location such that a line through the first location and the second location lies at an angle of other than 90° with respect to the first direction and the opposite direction, said second means being at least partly constructed of a material having a coefficient of thermal expansion such that the distance between the first location and the second location changes with the temperature variations to produce a first motive force on said first means;

third means constraining the optical means to move in the first and opposite direction;

additional optical means; and additional means having a first portion connected to the additional optical means so that movement of said additional means is accompanied by movement of the additional optical means and having a second portion connected to said second means at an additional location between the first location and the second location so that the temperature variations produce movement of the additional optical means.

5. Apparatus according to claim 4 including means to constrain the additional optical means to move in the first and opposite direction and wherein the additional location is chosen so as to provide movement of the additional optical means in proportion to but of lesser magnitude than the movement of said optical means.

* * * * *